(12) United States Patent
Catlin

(10) Patent No.: US 7,492,054 B2
(45) Date of Patent: Feb. 17, 2009

(54) RIVER AND TIDAL POWER HARVESTER

(76) Inventor: Christopher S. Catlin, 3619 Sweetwater Canyon Dr., Malibu, CA (US) 90265

( * ) Notice: Subject to any disclaimer, the term of this patent is extended or adjusted under 35 U.S.C. 154(b) by 79 days.

(21) Appl. No.: 11/585,722

(22) Filed: Oct. 24, 2006

(65) Prior Publication Data

US 2008/0093859 A1    Apr. 24, 2008

(51) Int. Cl.
- F03B 13/00    (2006.01)
- F03B 13/10    (2006.01)
- H02P 9/04    (2006.01)

(52) U.S. Cl. .......................... 290/54; 290/43

(58) Field of Classification Search ............... 290/42, 290/43, 53, 54; 60/398, 501; 415/7, 85; 416/7

See application file for complete search history.

(56) References Cited

U.S. PATENT DOCUMENTS

| | | | |
|---|---|---|---|
| 669,852 A | 3/1901 | Peterson | |
| 882,694 A | 3/1908 | Kirschweng | |
| 2,501,696 A | 3/1950 | Souczek | |
| 3,978,345 A * | 8/1976 | Bailey | 290/54 |
| 3,986,787 A | 10/1976 | Mouton, Jr. et al. | |
| 4,095,421 A * | 6/1978 | Silcox | 60/398 |
| 4,205,943 A | 6/1980 | Vauthier | |
| 4,206,601 A * | 6/1980 | Eberle | 60/398 |
| 4,281,257 A * | 7/1981 | Testa et al. | 290/42 |
| 4,316,704 A * | 2/1982 | Heidt | 417/100 |
| 4,345,434 A * | 8/1982 | Nedyalkov | 60/398 |
| 4,368,392 A * | 1/1983 | Drees | 290/54 |
| 4,383,182 A | 5/1983 | Bowley | |
| 4,398,095 A * | 8/1983 | Ono | 290/53 |
| 4,524,285 A | 6/1985 | Rauch | |
| 4,598,210 A | 7/1986 | Biscomb | |
| 4,717,831 A * | 1/1988 | Kikuchi | 290/53 |
| 4,722,665 A * | 2/1988 | Tyson | 416/84 |
| 4,737,070 A | 4/1988 | Horiuchi | |
| 4,754,157 A * | 6/1988 | Windle | 290/53 |
| 4,864,152 A | 9/1989 | Pedersen | |
| 4,868,408 A | 9/1989 | Hesh | |
| 5,946,909 A * | 9/1999 | Szpur | 60/398 |
| 6,091,161 A | 7/2000 | Dehlsen et al. | |
| 6,531,788 B2 | 3/2003 | Robson | |

(Continued)

FOREIGN PATENT DOCUMENTS

JP    56113065 A * 9/1981

(Continued)

*Primary Examiner*—Julio Gonzalez
(74) *Attorney, Agent, or Firm*—Kelly W. Cunningham; Cislo & Thomas, LLP

(57) ABSTRACT

An improved tidal and river energy converter having a semi-submerged device designed to harvest energy from the tidal and river sites. Each device is connected to other like devices to form an interconnected array of tidal and river energy devices that are anchored to the shore at right angles to the prevailing tidal and river current. Each device is composed of a supporting floatation hull attached to a submerged strut supporting an air compressor driven by a slow rotating propeller. The air compressor is connected through a streamlined mooring system to the other air compressors in the array and those in turn are connected to a high pressure line leading underwater to an onshore air turbine electric generator connected to the local power grid.

21 Claims, 4 Drawing Sheets

U.S. PATENT DOCUMENTS

Figure 1:
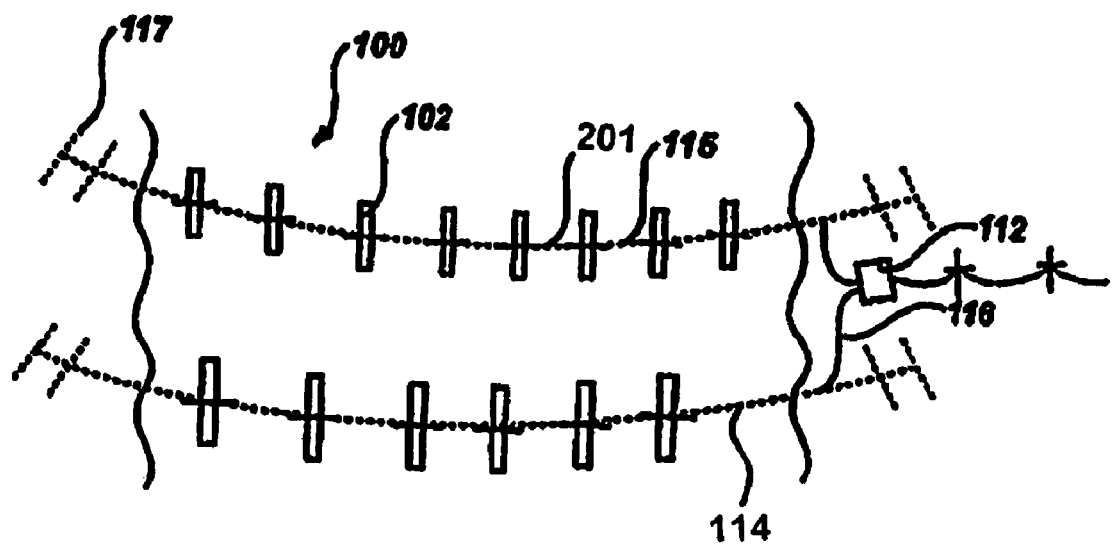

| | | |
|---|---|---|
| 6,647,716 B2 | 11/2003 | Boyd |
| 6,652,221 B1 | 11/2003 | Fraenkel |
| 6,935,832 B1 | 8/2005 | Platt et al. |
| 6,963,802 B2 | 11/2005 | Enis et al. |
| 7,155,912 B2* | 1/2007 | Enis et al. .................. 60/652 |
| 7,199,484 B2* | 4/2007 | Brashears .................. 290/54 |
| 7,254,944 B1* | 8/2007 | Goetzinger et al. .......... 60/398 |
| 7,307,356 B2* | 12/2007 | Fraenkel .................. 290/54 |
| 2003/0145586 A1* | 8/2003 | Shields .................. 60/398 |
| 2006/0125242 A1* | 6/2006 | Fraenkel .................. 290/54 |
| 2006/0232075 A1* | 10/2006 | Fraenkel .................. 290/54 |
| 2008/0012345 A1* | 1/2008 | Parker .................. 290/54 |

FOREIGN PATENT DOCUMENTS

| | | | |
|---|---|---|---|
| JP | 57028875 A | * | 2/1982 |
| WO | WO 89/11592 | | 11/1989 |

\* cited by examiner

RIVER AND TIDAL POWER HARVESTER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to the field of energy, specifically to a device that can produce mechanical, pneumatic and electrical energy from river and tidal hydropower sources with maximum efficiency, minimum cost and without producing any greenhouse gases (GHG) emissions.

2. Prior Art

Today, our energy economy seems to be humming along like a perpetual motion machine. Billions of people enjoy an unprecedented standard of living and nations are floating in rivers of wealth, in large part because, around the world, the energy industry has built an enormous network of oil wells, supertankers, pipelines, coal mines, power plants, transmission lines, cars, trucks, trains and ships—a gigantic, marvelously intricate system that almost magically converts oil and its hydrocarbons cousins, natural gas and coal, into the heat, power and mobility that animate modern civilization. For one hundred years this manmade wonder has performed nearly flawlessly until global oil consumption rose to equal or exceed global oil production and oil prices tripled.

The search for new sources of energy has become the most important challenge for the new century. Fully 25% of the world's proven oil reserves sits under Saudi Arabia. Add its four neighboring kingdoms and that number soars to 66%. The absolute cost of carbon-based fuels, particularly petroleum, has increased dramatically over the last decade along with the political and military consequences caused by the world's increasing reliance on it. And now there is a direct connection between petroleum emissions and the increasing problems of global warming, urban pollution and serious health issues for children as well as the elderly.

The world needs to spend one trillion dollars a year in alternative fuels, starting 20 years before the peak in conventional oil production, in order to mitigate fuel shortages, a United States Energy Department study concludes. Production peaks in Texas, the United Kingdom, and Norway were examined as part of two studies for the department that advised on "crash course" efforts to cope with an eventual shortage of gasoline and other liquid fuels. The study didn't predict when world production will peak, though the lead author said within the next five to ten years. Using the lower 48 states of the United States as a model, the study based calculations on a 2% annual decline in world production once the peak is reached, leading to a large global shortage 20 years later. Field declines may well be quicker, he said. To lessen the impact, it concluded, we have to start a long time before the peak or we'll have severe liquid fuels shortages worldwide. Conventional oil production peaked in Texas in 1972, North America in 1985, the United Kingdom in 1999, and Norway in 2001, and all of those peaks were sharp and sudden. To offset losses when world output peaks, "unconventional oil" will need to be rapidly developed, including heavy oil, oil sands, coal liquefaction, gas-to-liquids, enhanced oil recovery and renewables.

Energy production has now been conclusively linked to global warming. Its emissions emit $CO_2$ and particulate that reduces the ozone layer and adds micro-particles to the atmosphere. If our rate of fossil fuel burning continues to grow we could eventually transform Earth into a different planet. A 420,000 year record of carbon dioxide and temperature developed from the study of a 3.6 kilometer ice core recovered from Antarctica demonstrates that the Earth's climate system overreacts to even small nudges. The levels of carbon dioxide and temperature oscillate in a cycle every 100,000 years in step with minute changes in the shape of Earth's orbit around the Sun. These orbital changes that paced the ice ages were incredibly small. They had little effect on the total amount of sunlight reaching the Earth in a single year, only its distribution over seasons and latitudes. Nevertheless, these minute redistributions led to swings in temperature of about 5 degrees C and variations in sea level of more than 100 meters. Greenhouse gases on the other hand control the brightness of the sun—adding a trillion tons of carbon dioxide to the atmosphere thus far in the industrial era which dwarfs the redistributions in sunlight that once switched the planet back and forth between glacial and interglacial. We must now realize that humans control the global climate, for better or worse.

Earth is now passing upward through the highest temperatures of the past 12,000 years and we will soon be only a half a degree from the highest points that have been reached only a few times in the past two million years. If we continue business as usual it has been estimated temperatures will rise between two to three degrees this century, making the Earth as warm as it was about three million years ago when the seas were between 15 to 35 meters higher than they were today.

Harnessing and consuming energy requires some type of energy investment or net energy typically given as per unit of energy invested (EROI). In the 1930's, US oil was easy to recover, in many cases it was almost at the surface and had an EROI of 100:1. Since then oil has gotten deeper, harder to find, more viscous, higher sulfur content, etc, and now has a typical EROI of about 10:1. The total refined EROI of today's oil is somewhere between 5-10:1. In comparison, wind has an EROI of 7:1, solar is 5:1 and ethanol is 1.2:1.

Today, the world uses about 13 terawatts of power, approximately 80 percent of it from carbon dioxide emitting fossil fuels. If we want to keep Earth's average temperature low enough to prevent eventual large sea level rises and also accommodated 3 percent annual economic growth we will need between 10 and 30 terawatts of new carbon free power by 2050. The only solution is to develop an energy that does not produce heat, carbon dioxide, carbon particulate, SO2, and waste products or need an extensive global supply and refining system. Also we do not want an energy producing technology that fills up the countryside with machinery eyesores and noise. Oil certainly does not meet these new requirements, nor does ethanol, biomass or even wind or conventional hydropower. Only solar and tidal and river power meet these high energy standards.

Such a transition of substance will have profound implications for the economy, the environment, and U.S. foreign policy. Thomas Friedman, New York Times columnist and author of "The World is Flat, A Brief History of the Twenty-First Century" has published an article in Foreign Policy magazine, stating that the price of oil and the pace of freedom always move in opposite directions. Many of the Third World countries suffer from polluted cities affecting their tourism, high petroleum import costs and growing power grid failures weakening their economies and their fragile currencies.

Besides the ecological consequences, the rise in oil prices represents a big redistribution of income from those who buy it to those who produce it. This year, oil exporters could haul in $700 billion from selling oil to foreigners. The IMF estimates that oil exporters current account surplus could reach $400 billion, more than four times as much as in 2002. The top net oil exporters are: Saudi Arabia, Russia, Norway, Iran, UAE, Nigeria, Kuwait, Venezuela, Algeria and Libya. This will eventually produce a global political, economic and military power shift from users to producers.

The second most important challenge for the new century is clean water. And energy is the major component of making clean water. The CIA, PricewaterhouseCoopers and, most recently, Britain's Ministry of Defense have all raised the specter of future water wars. With water availability shrinking across the Middle East, Asia and sub-Saharan Africa, so the argument runs, violent conflict between states is increasingly likely.

We may be heading for an era of hydrological warfare in which rivers, lakes and aquifers become national security assets to be fought over, or controlled through proxy armies and client states. By 2025, more than two billion people are expected to live in countries that find it difficult or impossible to mobilize the water resources needed to meet the needs of agriculture, industry and households. Population growth, urbanization and the rapid development of manufacturing industries are relentlessly increasing demand for finite water resources.

In parts of India, groundwater levels are falling so rapidly that from 10 percent to 20 percent of agricultural production is under threat. In the Middle East, the world's most severely water-stressed region, more than 90 percent of usable water crosses international borders. From the Aral Sea in Central Asia to Lake Chad in sub-Saharan Africa, lakes are shrinking at an unprecedented rate. In effect, a large section of humanity is now living in regions where the limits of sustainable water use have been breached—and where water-based ecological systems are collapsing.

Hydropower

Every hour, more energy from sunlight strikes the Earth than is consumed on the planet in a year. But the planet's expansive surface area spreads the energy out into very low energy density levels. Only approximately 1-2 watts/square meter of solar power is available on average. The enormous amount of solar energy absorbed by the entire Earth's surface area transfers via heat and evaporation to the planet's atmosphere which is an enormous heat engine condensing the energy many times over into several types of hydropower where it is many times energy denser and can be harnessed more efficiently.

River Power

The Hydrologic Cycle is the water cycle that is cycling water through the Earth system and it is a cycle of energy as well. Solar energy strikes the earth causing evaporation, the phase change of liquid into a vapor. Evaporation is an important means of transferring energy between the surface and the air above.

Of the renewable energy sources that generate electricity, hydropower is the most often used. It accounted for 7% of US generation and 45% of renewable generation in 2003. Currently mechanical energy is derived by directing, harnessing or channeling moving water. The amount of available energy in moving water is determined by its flow or fill. Swiftly moving water in a big river carries a great deal of energy in its flow. So too water descending from a very high point. In either case the water flows through a pipe or penstock then pushes against and turns blades in a turbine to spin a generator to produce electricity.

Although hydropower is a clean and unlimited source of energy, it often comes with a high price. It is currently dominated by huge expensive dams which displace people, flood vast areas and wipe out fish populations that need open rivers to spawn. Holding back further use of hydropower per has been the lack of an efficient, inexpensive and environmentally friendly device to extract energy from water. Recent studies have shown hydropower to have other major drawbacks. Reservoirs behind the world's large dams now cover almost 600,000 km3, an area nearly twice the size of Italy. Fluctuating water levels of many tropical reservoirs create excellent breeding grounds for malaria and other disease carrying life. Most dams also present insurmountable obstacles to the movement of aquatic species. And large reservoirs have been recently found to be significant sources of greenhouse gases due to the aging of river water. Possibly the major problem with dams is the long term threat to the viability of their reservoirs caused by excessive silting. These high sediment loads also effect the operation of the plant by throttling the feeder tunnels, eroding guide vanes and runner blades. Deposition in reservoirs has effects far downstream as it cuts global sediment flow in rivers by more than 25% and reduces the amount of silt, organic matter and nutrients available to alluvial planes and costal wetlands downstream. As a result some coastlines are eroding at rapid rates.

When considering hydropower one must take into account that rivers have many essential functions. Most major cities of the world are built beside rivers. Commercial river craft need to use rivers for commerce. People use rivers for boating, swimming and fishing. Rivers lend important atheistic value to the area around them. Nature uses rivers to provide a home for plants and animals as well as carry important sediments downstream. Dams interrupt the ecology of the natural river system as well as degrade water quality. Their turbines cause high fish mortality. And dams affect the environment by converting large tracts of land normally used as towns, scenic locations, archeological resources, fish and wildlife habitat, farmland, grazing and other uses into vast reservoirs.

Tidal Power

Production of electricity by harnessing the power of tidal currents is being examined with renewed interest by many industrialized nations. Tidal power systems are being considered for India, Canada, China, Mexico, UK, US and Russia. It has been estimated there is up to 3,000 GW of energy in total global tidal waters. Tidal power has become economically feasible as a result of the continuous rise in the price of fossil fuels. A number of nations already possess working tidal driven electric generating facilities. And tidal power is highly predictable unlike wind and solar.

The generation of electricity from tides is very similar to hydroelectric generation, except that water is able to flow in both directions and this must be taken into account in the development of the generators. The simplest generating system for tidal plants, known as an ebb generating system, involves a dam, known as a barrage constructed across an estuary. Sluice gates on the barrage allow the tidal basin to fill on the incoming high tides and to exit through the turbine system on the outgoing tide. Alternatively, flood-generating systems, which generate power from the incoming tide are possible, but are less favored than ebb generating systems. Power is produced for 6 to 12 hours of every 24 hours.

A (barrage) tidal power plant is similar in principle to hydropower generation facilities. A barrage (dam) with a powerhouse and turbines is constructed across an estuary or bay to form a basin of sufficient size to allow production of electricity over a reasonable period. For the simplest design, the basin is allowed to fill during flood tide through floodgates and powerhouse, with turbines spinning freely and power is produced on ebb tide.

Tidal fences are composed of individual, vertical axis turbines which are mounted within the fence structure, known as a caisson, and they can be thought of as giant turn styles which completely block a channel, forcing all of the water through them. Unlike barrage tidal power stations, tidal fences can also be used in unconfined basins, such as in the channel between the mainland and a nearby off shore island, or between two islands. As a result, tidal fences have much less impact on the environment, as they do not require flooding of the basin and are significantly cheaper to install. Tidal fences also have the advantage of being able to generate electricity once the initial modules are installed, rather than after complete installation as in the case of barrage technologies. Tidal fences are not free of environmental and social concerns, as a caisson structure is still required, which can disrupt the movement of large marine animals.

Tidal turbines have only become reality in the last five years. Resembling a wind turbine, tidal turbines offer significant advantages over barrage and fence systems, including reduced environmental effects. Tidal turbines utilize tidal currents that are moving with velocities of between 4 to 6 knots. Offshore tidal power generation ("tidal lagoons") is a new approach to tidal power conversion that resolves the environmental and economic problems of the familiar "tidal barrage" technology. Tidal lagoons use a rubble mound impoundment structure and low-head hydroelectric generating equipment situated up to a mile or more offshore in a high tidal range area.

Problems with river and tidal power.

(a) Most devices require a dam, tidal barrage, embankments, caissons or sluices to be built;
(b) Some devices cannot be removable without damage to site;
(c) Many devices create an impediment to aquaculture;
(d) Most devices create greenhouse gas emissions caused by aerobic growth in backup reservoir;
(e) Some devices reduce downstream sediment layering;
(f) Most devices require significant elevation change;
(g) Some devices reduce aeration of water;
(h) Due to their complexity most devices are limited to where they can be sited;
(i) Many devices are not swimmer and boat safe;
(j) Most devices are not safe for fish and river life;
(k) Some devices emit noise;
(l) Many devices have high initial build costs;
(m) Many devices are limited to few river sites in terms of depth, width, speed of water, bottom shape;
(n) Some devices require costly high load capacity roads to be built to site;
(o) Many devices have complicated electrical systems requiring expensive and vulnerable seals;
(p) Most devices cannot be fabricated of recycled materials which decreases their total lifecycle energy costs;
(q) Most devices have an observable outline making them eyesores;
(r) Most devices cannot meet the global strategy required to deal with the successful commercialization of a low-density global energy source. This requires large numbers of devices operating all over the world and includes an ease of transportability across national border;
(s) Many devices change the turbidity of the water;
(t) Some devices alter the salinity of the water;
(u) Most devices create pollutant accumulation;
(v) Some devices have high capital cost;
(w) Many devices have high visibility;
(x) Most devices are an impediment to aquaculture;
(y) Some devices are not safe for fish and tidal area life;
(z) Most devices have high initial build and operating costs;
(aa) Many devices need to be custom configurable for most tidal sites in terms of depth, width, speed of water, bottom shape;
(bb) Most devices are not transportable to site;
(cc) Many devices are difficult to remove without damage to site;
(dd) Many devices do not produce enough energy returned to replace the total energy invested.
(ee) Some devices require extensive anchoring systems which are expensive, time consuming to install and affect marine life.

BACKGROUND OF THE INVENTION—OBJECTS AND ADVANTAGES

Accordingly, several objects and advantages of my invention are:

(a) The device does not require a dam, tidal barrage, embankments, caissons or sluices need to be built;
(b) The device can be removable without damage to site;
(c) The device does not create an impediment to aquaculture;
(d) The device does not create greenhouse gas emissions caused by aerobic growth in backup reservoir;
(e) The device does not reduce downstream sediment layering;
(f) The device does not require significant elevation change;
(g) The device does not reduce aeration of water;
(h) Due to its simplicity the device is not limited to where it can be sited;
(i) The device is swimmer and boat safe;
(j) The device is safe for fish and river life;
(k) The device operates without noise;
(l) The device has low initial build costs;
(m) The device is not limited to few river sites in terms of depth, width, speed of water, bottom shape;
(n) The device does not require costly high load capacity roads to be built to site;
(o) The device does not have complicated electrical systems requiring expensive and vulnerable seals;
(p) The device can be fabricated of recycled materials which decreases their total lifecycle energy costs;
(q) The device has an almost unobservable outline;
(r) The device can meet the global strategy to deal with the successful commercialization of a low density global energy source. This requires large numbers of devices operating all over the world and includes an ease of transportability across national border;
(s) The device does not change the turbidity of the water;
(t) The device does not affect the salinity of the water;
(u) The device does not create pollutant accumulation;
(v) The device does not have high capital cost;
(w) The device does not have high visibility;
(x) The device is not an impediment to aquaculture;
(y) The device is safe for fish and tidal area life;

(z) The device does not have high initial build and operating costs;

(aa) The device does not need to be custom configurable for most tidal sites in terms of depth, width, speed of water, bottom shape;

(bb) The device is transportable to site;

(cc) The device is not difficult to remove without damage to site;

(dd) The device produces more energy returned to replace the total energy invested.

(ee) The device requires a minimal anchoring system making it quick and cheap to install and does not affect marine life.

SUMMARY

The present invention relates to a river and tidal energy generation system. The invention is of a rugged and mobile design that is low cost and energy efficient. An array of interconnected energy devices designed for both river and tidal siting are arrayed across the path of the direction of the primary current so as to absorb and convert the largest spectrum of kinetic energy to pneumatic, mechanical or electric energy. The invention has a non-fouling, self-cleaning surface that repels both debris and marine growth. Its low operational speed, rounded surfaces and minimal mooring system provides the ultimate safety for wildlife. When loads approach the maximum the unit is designed to shed loads. It has a minimum number of parts to reduce costs and breakdowns as well as maximizing the use of available parts. It minimizes internal, inertial/mass, the number of energy conversion stages and surface friction to offer high overall energy conversion efficiency. It is easy to install and to remove and from its operational site. It is primarily made of recycled materials can be mass producible at low cost. No energy costs, fees, royalties, real estate tax are needed to be paid—river energy is both free and abundant. It produces no greenhouse gas (GHG) emissions, directly or indirectly.

DRAWINGS—FIGURES

The present invention may be better understood, and its numerous features and advantages made apparent to those skilled in the art by referencing the accompanying drawings. For ease of understanding and simplicity, common numbering of elements within the illustrations is employed where an element is the same in different drawings.

Figure 2:
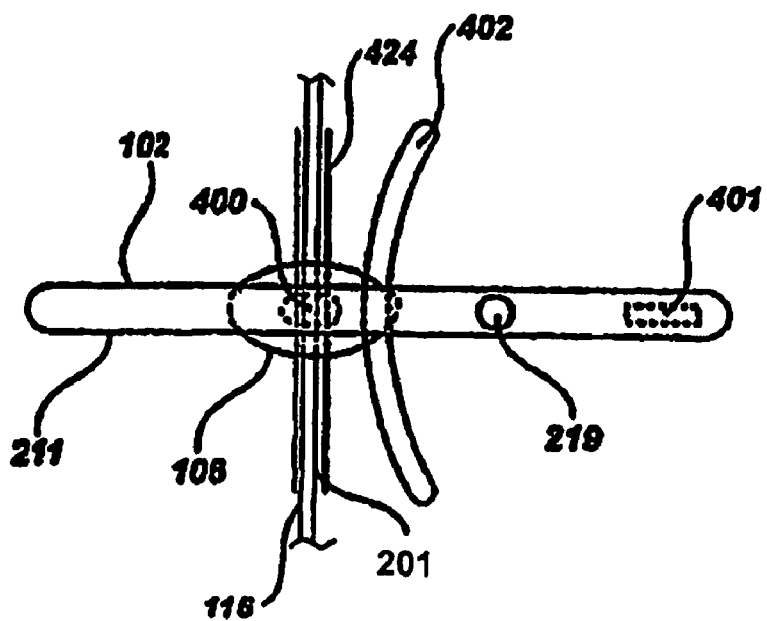
Figure 3A:
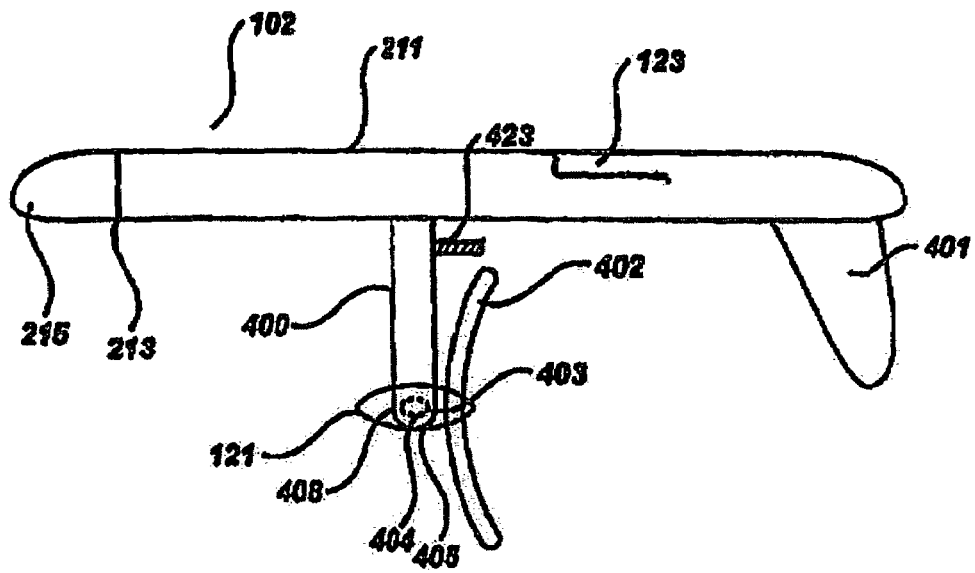
Figure 3B:
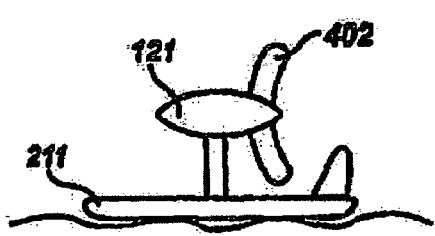
Figure 3C:
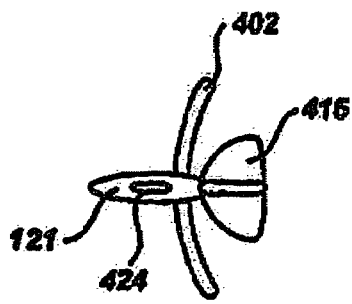
Figure 3D:
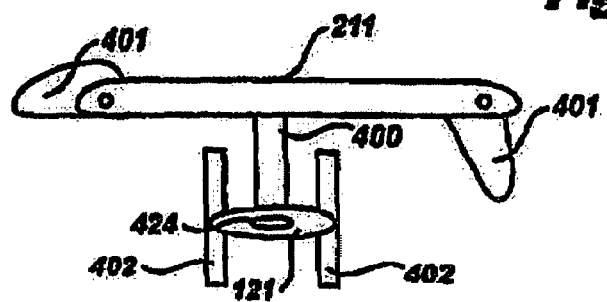
Figure 3E:
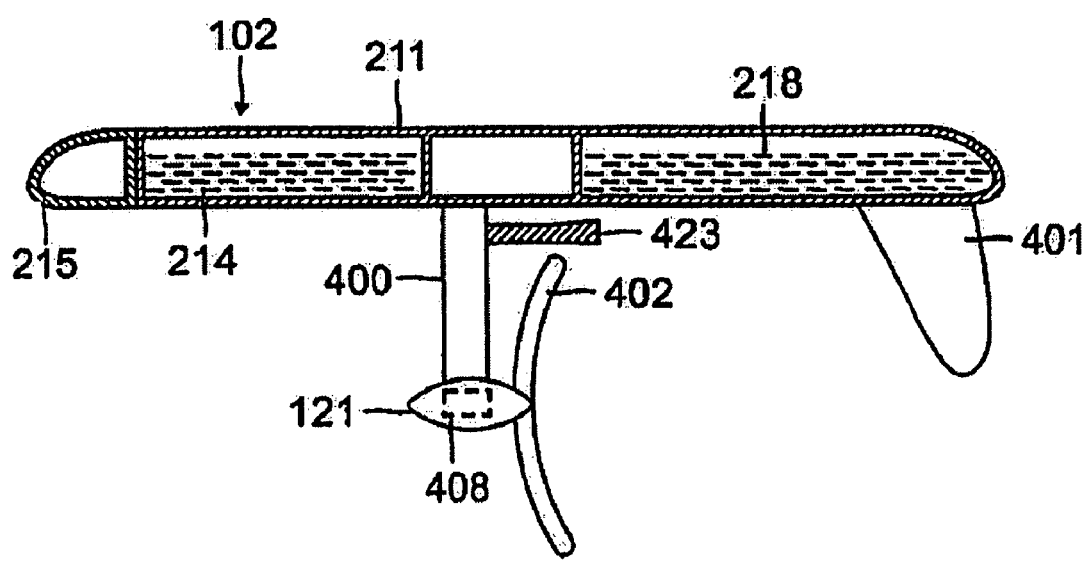
Figure 4:
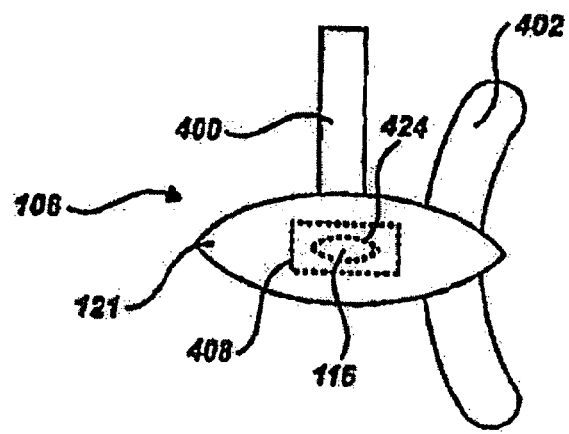
Figure 5:
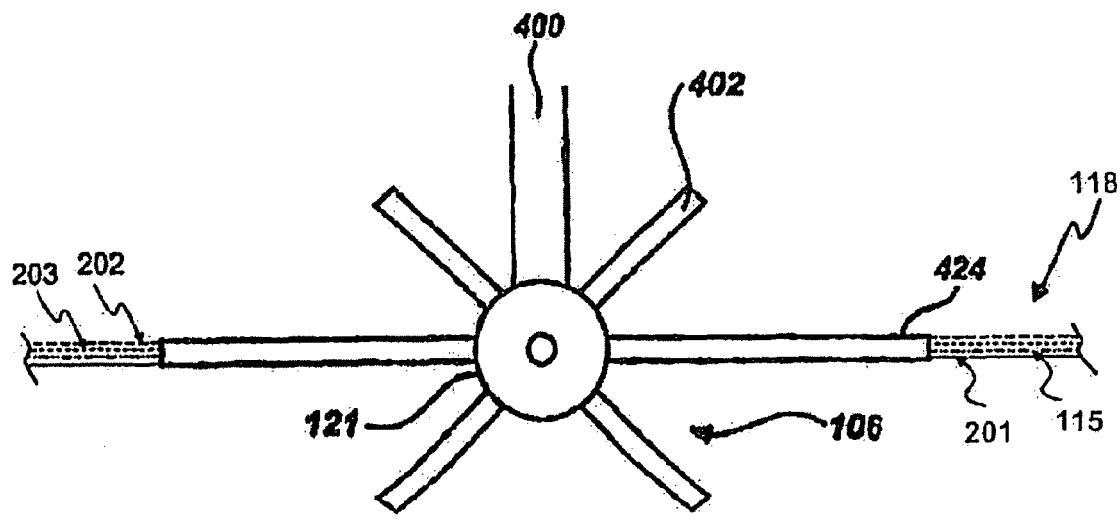

FIG. 1 is the top plan view of interconnected river and tidal power module incorporating the principles of the invention FIG. 2 is the top plan view of the river and tidal power module with a portion of the wing-shaped polymer shell removed FIG. 3a is the side plan view of the surface stabilized river and tidal power module FIG. 3b is the side plan view of the bottom stabilized river and tidal power modules FIG. 3c is the side plan view of the current stabilized river and tidal power modules FIG. 3d is the side plan view of the tidal power module FIG. 3e is a cross-sectional side view of the river and tidal power module FIG. 4 is the side plan view of the energy absorber FIG. 5 is the front plan of the energy absorber

DRAWINGS—REFERENCE NUMERALS

100 Array of Devices
102 River and Tidal Energy Module
106 Energy Absorber
112 Electric Generator Plant
114 Underwater Pressure Lines
115 Mooring Cable
116 Compressed Air Pipes
117 Drill-in Anchors
118 Mooring System
120 Air Turbine Electric Generator
121 Nacelle
123 Wiring Harness
202 Electrical Power Cable
203 Communications Cable
205 Electro-Pneumatic Controller
211 Stabilizer Tube
213 Crash Bulkhead
214 Nose Section
216 Adjustable Flap
217 Flexible Coupling
219 Onboard Computer
400 Strut
401 Rudder
402 Propellers
403 Drive Shaft
404 Gearbox
405 One Way Valve
408 Air Compressor
409 Waterproof Housing
414 Navigation Lights
415 Aft Stabilizer Fins
421 Pneumatic Controller
423 Anti-Cavitation Plate
424 Wing-Shaped Polymer Shell

DETAILED DESCRIPTION OF THE INVENTION—FIGS. 1, 2, 3a, 3b, 3c, 3d, 4, 5, 6—PREFERRED EMBODIMENT

The following is a detailed description of illustrative embodiments of the present invention. As these embodiments of the present invention are described with reference to the aforementioned drawings, various modifications or adaptations of the methods or specific structures described may become apparent to those skilled in the art. All such modifications, adaptations, or variations that rely upon the teachings of the present invention and through these teachings have advanced the art, are considered to be within the spirit and scope of the present invention.

FIG. 1 is a top view of an Array of Devices 100 composed of a plurality of individual submerged and floating versions of the River and Tidal Energy Modules (the invention) 102 deployed across a river site. Each of the River and Tidal Energy Modules 102 is connected to another by a Mooring Cable 115 composed of an approximately three inch diameter high tensile steel cable moored to each end of the shore by a series of Drill-in Anchors 117. The individual River and Tidal Energy Modules 102 measure approximately 30 feet long by 3 feet wide with an approximate draft of 18 feet. Each of the River and Tidal Energy Modules 102 is connected via Underwater Pressure Lines 114 and Mooring Cable 115 leading on-shore to Compressed Air Pipes 116 to an on-shore Electrical Generating Plant 112.

FIG. 2 is the top plan view of the River and Tidal Energy Module 102. Each River and Tidal Energy Module 102 is composed of an Energy Absorber or energy converter 106 comprising one approximately fifteen foot diameter approximately four bladed Propellers 402 driving an approximately 50 kW/67 HP Air Compressor 408. Each 30 foot long River and Tidal Energy Module 102 is approximately 30 feet abeam of the next River and Tidal Energy Module 102 in the Array of Devices 100. FIG. 3a is the side plan view of the surface stabilized River and Tidal Energy Module 102. FIG. 3b is the side plan view of the bottom stabilized River and Tidal Module 102 in a bottom site location. FIG. 3c is the side plan view of the current stabilized River and Tidal Module 102 replacing the Stabilizer Tube 211 and Strut 400 with Aft Stabilizer Fins 415.

FIG. 4 is the front view of the River and Tidal Energy Module 102. FIG. 5 is the side view of the Energy Absorber 106 and FIG. 6 is the front view of the Energy Absorber 106. Each Energy Absorber 106 is composed of an approximately 9 foot long Strut 400, incorporating a four bladed Propellers 402, Driveshaft 403, Gearbox 404 and Air Compressor 408. The Energy Absorber 106 resembles an outboard motor configuration where the lightweight composite Propeller 402 is attached to the back of the streamlined Nacelle 121 attached to the lower section of the Strut 400. A self-lubricating stainless steel Driveshaft 403 carries the rotational power to a step-up Gearbox 404 and Air Compressor 408 encased in the waterproof Nacelle 121, which is finned for cooling of the unit. Each of the Energy Absorbers 106 per River and Tidal Energy Module 102 is attached through the top of the Strut 400 to the approximate center of the Stabilizer Tube 211.

The Stabilizer Tube 211 is composed of thin wall steel tube sections fitted and welded together. The bow section has a Crash Bulkhead 213 incorporated into it. The bow is streamlined with a negative lift shape and has a soft skinned Nose Section 215. The stern section has the same negative lift shape. A medium aspect Rudder 401 is attached to the aft or stern of the Stabilizer Tube 211.

Each blade of the Propeller 402 is hinged at the hub attached to the Driveshaft 403. An Electro-Pneumatic Controller applies a steady pressure on each blade of the Propeller 402 to keep each blade open.

The invention's Wiring Harness 123 is applied to the flat polymer surface coating of the formed and rolled steel panels by a robotic printer.

The air compression system for each River and Tidal Energy Module 102 is composed of approximately one Propeller 402 driven Air Compressors 408 connected via the pressurized Stabilizer Tube 211 which also serves as an accumulator. It is connected through the High Pressure Hose to the next River and Tidal Energy Module 102 thus connecting all River and Tidal Energy Modules 102 into the Array of Devices 100. These accumulators include the Stabilizer Tubes 211 and River and Tidal Energy Module 102, High Pressure Hose, Underwater Pressure Lines 114, Compressed Air Pipes 116 and the on-shore Storage Reservoirs.

Each River and Tidal Energy Module 102 is connected through One Way Valves 405 to High Pressure Hose that connects through all the River and Tidal Energy Modules 102 in the Array of Devices 100 and sends the compressed air via Underwater High Pressure Lines 114 shore side where it is converted by Air Turbine Generators 120 to utility grade electric energy.

In another embodiment, the River and Tidal Energy Module 102 is modified to be utilized to harness tidal energy and has a flip up Rudder 401 attached to both ends of the Stabilizer Tube 211, as shown in FIG. 3d. It also has Propellers 402 attached to both ends of the Nacelle 121 that are connected to the Air Compressor 408 through a common Drive Shaft 403.

A Telecommunications Module 203 is placed under an inspection hatch in the rear collision bulkhead of the Stabilizer Tube 211 on one unit per Array of Devices 100. The Telecommunications Module 203 includes a flat panel satellite receiver.

The Propeller 402 is basically a lightweight version of the traditional propeller optimized for the 3 or more mph velocity of the average slow, wide major rivers of the Continental United States. Each blade is curved to shed debris. An Anti-Cavitation Plate 423 to reduce air intrusion to the Propeller 402 can be added to Strut 400 for higher speed rivers and tidal currents.

The compressed air system has minimum working parts, is lightweight, cheap and non-corrosive. The Electric Generator Plant 112 is sited on the shore or utilizing Compressed Air Pipes 116, can be laid to a site further inland. The shore side compressed air powered Electric Generator Plant 112 is silent, non polluting and much smaller in scale without the need for the coal, oil or nuclear energy producing side of the plant.

The Mooring System 118 is a vital part of the invention. It does not just connect the Array of Devices 100 to each side of the riverbank but is designed to stabilize each River and Tidal Energy Module 102 to maximize performance as well as support the energy transmission system. It holds each River and Tidal Energy Module 102 of the Array of Devices 100 in a fore and aft and side to side position as well as negates the rotational forces of the Energy Absorber 106. The Mooring Cable 115, High Pressure Hose 201, and Electrical Power Cable 202 and Communications Cable 203 are combined inside the streamlined Wing-Shaped Polymer Shell 424 which utilizes with the force of the passing current to create enough negative lift to eliminate any upward motion in each of the River and Tidal Energy Module 102. The Mooring Cable 115 which is suspended approximately 8 feet underwater penetrates the shoreline for approximately fifty feet connecting to a series of anchoring blocks of concrete or steel Drill-in Anchors 117.

Several Array of Devices 100 are stacked approximately 100 feet apart in a parallel formation behind the lead Array of Devices 100 thus maximizing the power output of a site. Their output is led shore side where it is combined to power a Air Turbine Electric Generator.

The invention's wiring is a cost-effective alternative for harness design. The invention's River and Tidal Energy Module 102 utilizes a print on wiring system which includes redundant wiring. An automated design and fabrication of the Wiring Harness 123 is utilized. The invention's Wiring Harness 123 is applied to the flat polymer surface coating of the formed and rolled steel by a robotic printer. Connections within the module's wiring are made through currently available electrical connector systems.

The Electric Generator Plant 112 technology is the same as steam turbo generators and gas turbines which are among the most reliable machines operated by modern society and unscheduled outages are rare. The turbine generators are of modular design, preferably with counter-rotating planes of blades mounted directly onto their own generator shafts. The air turbine generators used do not need to be marnized, lightweight of small size which would be the case if they were placed on each River and Tidal Energy Module 102. This reduces cost and maintenance considerably. The entire unit can be built of standardized modular construction to minimize site specific design, site work and in-situ construction. The Electric Generator Plant 112 can be sited on the shore or Compressed Air Pipes 116 can be laid to a site further inland. The compressed air turbine driven generator systems operates silently and is non-polluting. The entire Electric Generating Plant 116 is of much smaller scale then an equal size fuel fed plant because there is no need for the coal, oil or nuclear energy fuel side of the plant. The particular type of location would not be limited by current oil/gas electric generation emissions, safety and noise concerns.

For hydrogen production electrolyzers and water distillation systems are placed onshore beside the Air Turbine Electric Generator. The water distillation systems feed the electrolyzers which feed a hydrogen liquification module all powered by Air Turbine Electric Generator driven by the compressed air system. The liquefied hydrogen is then piped to users.

The survivability of the invention is inherent in the design and construction. The device is designed to be able to take maximum river and tidal conditions due to its unitized, low drag semi-submerged structure. The invention uses several approaches to combat corrosion, including protective coatings, high frequency vibration and cathodic protection—attracting corrosive chemicals to electrically charged plates of a dissimilar metal, known as sacrificial anodes, by running a weak electric current through the framework. The invention is self-cleaning. Data from the output of the Energy Absorber 106 and Network of Sensors in the hull signal when debris is impinging on performance causing the blades of the Propeller 402 of each Energy Absorber 106 to hinge back to clear itself. Using solid state light emitting polymers the nighttime and low visibility exterior is programmable offering numerous signage and warning lighting options. The top of each Energy Absorber 106 has two inexpensive solid state micro color cameras linked to the shore side monitors. The input of air for the compressed air system passes through a whistle mechanism at the top of a mast mounted on each River and Tidal Module 102 causing a steady pulsing warning tone.

Operation—FIGS. 1, 2, 3a, 3b, 3c, 3d, 4, and 5.

The invention harnesses hydropower along the full length of a river rather than the current configuration, using a dam at one location. The Array of Devices 100 composed of a plurality of individual submerged bottom, current stabilized and floating surface stabilized versions of the River and Tidal Energy Modules 102 is deployed across a river site. Each of the River and Tidal Energy Modules 102 is connected to the unit beside it by a Mooring Cable 115, High Pressure Hose 201, Electric Power Cable 202 and Communications Cable 203 all held together by a Wing-Shaped Polymer Shell 424. The Mooring Cable 115 is connected to each River and Tidal Energy Module 102 at a connection point in the middle of the Nacelle 121 and connected directly to the Air Compressor 408 at a depth of approximately 8 feet. The Stabilizer Tube 211 supports the weight of the Energy Absorber 106 and the Mooring System 118 maintaining the approximate eight foot depth of the unit. This maintains the Propeller 402 above the disturbed waters and rolling debris of the river bottom. The bow of the Stabilizer Tube 211 has a streamlined negative lift shaped soft-skinned Nose Section 215 which is marine life friendly and repels debris. A medium aspect Rudder 401 is attached to the aft of the Stabilizer Tube 211 which uses the energy of the passing current to keep the entire River and Tidal Module 102 pointed into the current.

The River and Tidal Energy Module 102 that is modified to be utilized to harness tidal energy has a flip up Rudder 401 attached to both ends of the Stabilizer Tube 211. It also carries Propellers 402 attached to both ends of the Nacelle 121 that are connected to the Air Compressor 408 through a common Drive Shaft 403. When the tidal flow changes direction both Propellers 402 begin rotating in the opposite direction which through the internal High Pressure Hose 201 activates the two Rudders 401 flipping one up and the other down. At the end of this cycle the output and input of the Air Compressor 408 is reversed.

The Propeller 402 attached to the aft end of the Nacelle 121 is basically a lightweight version of the traditional propeller optimized for the three or more mph velocity of the average slow, wide major rivers of the Continental United States. Each blade is curved to shed debris and each also uses a spring loaded hinge to pull back each blade if struck by debris. A self-lubricating stainless steel Driveshaft 403 carries the rotational power to a step-up Gearbox 404 and Air Compressor 408 encased in a streamlined waterproof Nacelle 121, which is finned for cooling of the unit.

The Propeller 402 of each adjacent Energy Absorber 106 rotates in the opposite direction to the one beside it therefore counteracting the rotational forces placed on the Array of Devices 100. The rotational forces of the Propeller 402, the drag of the Propeller 402, the forward and side loads of the Mooring Cable 115 and the vertical loads from the Stabilizer Tube are all directed into the Aluminum or Steel block of the Air Compressor 408. This centering of the major stresses on one load point on the Energy Absorber 106 reduces overall structural loads thus limiting the need for overbuilding of parts which reducing costs and weight.

The compressed air system has a minimum number of working parts and is lightweight, inexpensive and non-corrosive. The air compression system plays an essential role in the operation of the device. The losses associated with piping gases over long distances are considerably less than those associated with transmitting electricity. For instance, with respect to oxygen and hydrogen transmission, very little pumping power is required to move the gases through a pipeline. By way of analogy, in the transportation of natural gas, pressures of 700 psi are sufficient to move the gas over several hundreds of miles without the necessity of providing auxiliary pumping stations. Thus, in some cases it may be more efficient to provide pipelines for the compressed air product of river and tidal energy capture rather than suffering the losses in transmitting electricity over the many miles to an established electric energy grid.

The compressed air travels via the pressurized Stabilizer Tube 211, which serves as an accumulator, through the High Pressure Hose 201 to the next River and Tidal Energy Module 102 and on to the on-shore Storage Reservoirs 119 where it is converted by Air Turbine Generators 120 to utility grade electric energy. The air intake for the compressed air system can be placed on-shore or on each of the River and Tidal Energy Modules 102. The Electric Generator Plant 112 is sited on the shore, or utilizing Compressed Air Pipes 116, can be laid to a site further inland. The shore side compressed air powered Electric Generator Plant 112 is silent, non polluting and much smaller in scale without the need for the coal, oil or nuclear energy producing side of the plant. It is of standardized modular design to minimize site specific design, site work and in-situ construction. The air turbine generators are of modular design, preferably with counter-rotating blades mounted directly onto their own generator shafts. The Air Turbine Electric Generator 120 used do not need to be marinized, lightweight and of smaller size and therefore of significantly lower cost than those required if they were placed on each River and Tidal Energy Module.

The Electric Generator Plant 112 technology is the same as steam turbo generators and gas turbines which are among the most reliable machines operated by modern society and unscheduled outages are rare. The turbine generators are of modular design, preferably with counter-rotating planes of blades mounted directly onto their own generator shafts. The air turbine generators used do not need to be marinized, lightweight or of small size which would be the case if they were placed on each River and Tidal Energy Module 102. This reduces cost and maintenance schedules considerably. The entire Electric Generator Plant 112 can be built of standardized modular construction to minimize site specific design, site work and in-situ construction. The Electric Generator Plant 112 can be sited on the shore or Compressed Air Pipes 116 can be laid to a site further inland. The compressed air turbine driven generator systems operates silently and is non-polluting. The power plant location would not be limited by current oil/gas electric generation emissions, safety and noise concerns.

Wiring is a notoriously weak link in the marine environment. Not only is it constantly under attack by corrosion caused by the acidic environment, but it is under stress from the constant shock and vibration of the passing river currents. This is particularly relevant aboard each River and Tidal Energy Module 102 which is in the water 24/7 and is designed to absorb the energy of the River and Tidal currents rather than cut through or ride over the currents like a normal ship. Interconnections within the distribution box and interconnections to the wire harnesses can create an unmanageable bundle of wires. This consumes valuable space and requires costly manual point-to point wiring. Manual wiring not only reduces production efficiency, but also can cause wiring errors. Entangled wire bundles are often a potential for shorts and other types of electrical faults. The invention's wiring is a cost-effective alternative for the harness design. The invention utilizes a print on system with redundant wiring. An automated design and fabrication of the Wiring Harness 123 is utilized. The invention's Wiring Harness 123 is applied to the flat polymer surface coating of the formed and rolled steel by a robotic printer. The robot prints the electrical Wiring Harness 123 using electrically conductive polymer as it moves along the polymer coated surface of the panel or tube. Because hard wiring is not required, harness designs can be simplified and costs reduced. Connections within the module's wiring are made through the currently available electrical connector systems. It eliminates the valuable space and requires costly manual point-to point wiring not only improves production efficiency, but also reduces wiring errors.

The Mooring Cable 115 attaches to a modified ring threaded into the metal block of the Air Compressor 408. The Mooring System 118 is a vital part of the invention. It does not just connect the Array of Devices 100 to each side of the riverbank but is designed to interact and indeed counteract with each River and Tidal Energy Module 102 in order to reduce the forces in the overall mooring system and to maximize performance as well as support the Electric Power Cable 202, the Communications Cable 203 and the High Pressure Hose 201. It also stabilizes each River and Tidal Energy Module 102 of the Array of Devices 100 in the side to side and fore and aft plane and negates the rotational forces generated by the Propellers 402. The combined Mooring Cable 115, Compressed Air Tube 114, Electric Power cable 202 and Communications Cable 203 is connected in a streamlined Wing-shaped Polymer Shell 424 which utilizes the power of the passing current to develop enough negative lift to eliminate any upward motion in the River and Tidal Energy Module 102. The Mooring Cable 115, which is suspended approximately 8feet underwater, penetrates the shoreline at approximately the same depth using a trenching construction of approximately fifty feet in length and is attached to anchoring blocks of concrete or steel or the Drill-in Anchors 117.

The High Pressure Hose 201 connects to Compressed Air Pipes 116 which leads underground to the Air Turbine Electric Generator.

The River and Tidal Energy Module 102 in the form of Arrays of Devices 100 is such an efficient energy absorber of river energy allowing the efficient flow of the river current energy to pass through it and recombine with minimal turbulence. This allows several Arrays of Devices 100 to be stacked in a parallel formation behind the lead Array of Devices 100 thus maximizing the power output of a site. Their individual power outputs are led shoreside where they are combined to power a larger electric generator.

An key element of a successful renewable energy system is the need to quickly and cost efficiently produce large numbers of these devices due to the inherent low energy profile of River and Tidal power. Thus the inventor incorporated this requirement into his design. The invention uses mass producible design-for-assembly River and Tidal Energy Modules 102 utilizing a manufacturing system of hydro-formed thin wall steel tubes and panel sections welded or glued together and coated with a ballistic polymer.

The specially designed manufacturing system is composed of a number of interconnected manufacturing modules which are designed to be shipped in container cargo units so they can be exported globally. Once the shipping crates have arrived at the proposed production site, the first module to be opened is the Master Management Systems Module which includes computer hardware and software that connects and controls all phases of production. Its bundled software utilizes built-in artificial intelligence and fuzzy logic and can be quickly updated. It includes all the necessary production, finance, engineering, maintenance and marketing software to manage the energy module factory. This control module is composed of the main computer and a user-friendly manufacturing computer program. This is roughly comparable to the install program used in a home computer. The program automatically instructs the operators how to set up the entire manufacturing system in their own language while automatically checking all connections and software interfaces. Each module is designed to plug into the next to communicate with each module. Next to be implemented is the Power Management Systems Module which automatically upgrades the local electric power grid to the manufacturing system's electrical needs and protects the equipment from brownouts and surges. Next various specialized tooling modules are connected which produce key parts of the River and Tidal Energy Module 102.

A Telecommunications System is integrated into the Electric Generator Plant 112 which includes software to communicate with parts vendors for engineering and technical support, design feedback, and systems upgrades. A Supplier Net Module includes hardware and software to interface suppliers, both local and offshore, with manufacturing. It also includes a Recycling Module, which strips and separates the steel, polymer and parts from old and aged energy modules so they can be reused for manufacturing.

The use of this advanced manufacturing system allows the production plant to be shipped to almost country in the world and set up quickly to mass produce River and Tidal Energy Modules 102. Given that these devices are similar to automobiles from a manufacturing perspective, and given that 17 million vehicles are manufactured each year in the U.S. alone, River and Tidal Energy Modules 102 based on the inventor's design producing approximately 10,000 units could be built in one regional manufacturing plant and installed in less than 12 months once the tooling is in place.

For hydrogen production electrolyzers and water distillation systems are placed onshore beside the Electric Generator Plant 112. The water distillation systems feed the electrolyzers which feed a hydrogen liquification module all powered by shoreside air turbines driven by the overall compressed air system. The liquefied hydrogen is then piped to users.

The survivability of the invention is inherent in the design and construction. The device is designed to be able to take maximum river and tidal conditions due to its unitized, low drag semi-submerged structure. Data from the output of the Energy Absorber Module 102 and Network of Sensors in the hull signal when debris is impinging on the overall energy production performance of the River and Tidal Energy Module 102 causing the blades of the Propeller 402 of the Energy Absorber 106 to hinge back to reduce drag. The invention uses several approaches to combat corrosion, including protective coatings, high frequency vibration and cathodic protection—attracting corrosive chemicals to electrically charged plates of a dissimilar metal, known as sacrificial anodes, by running a weak electric current through the framework. Using solid state light emitting polymers the nighttime and low visibility exterior is programmable polymers offering numerous signage and warning lighting options.

A Network of Sensors molded into the River and Tidal Energy Module 102 continuously monitors the performance of the various subsystems, River and Tidal environment and security, feeding an Onboard Computer 219. The biologically inspired central control system works like the synapses of the brain with each sensor responding to different inputs thus integrating huge amounts of information. The Stabilizer Tube 211, Energy Absorber 106, Network of Sensors and the Communication System form a network on the river to increase the intelligence of the device and connect it to the outside world. Software monitors 100% of all systems and automatically reports any anomalies to global and regional franchise computers notifying them of a needed service appointment. This controls in real time the performance of the River and Tidal Energy Module 102 and ensures the constant and efficient conversion of the widest spectrum of river and tidal energy. System management includes sophisticated techniques for automatically disconnecting the system in very powerful river and tidal currents, and automatically reconnecting when the river or tidal flow returns to normal profiles. The Array of Devices 100 is designed to be easily and cost effectively transportable to the construction site.

The Electric Generator Plant 112 can be sited on the shore or the underground Compressed Air Pipes 116 leading on shore can be laid to a Electric Generator Plant 112 site further inland. The shore side compressed Air Turbine Generator 120 is of much smaller scale than standard fossil fuel power plants without the need for the coal, oil or nuclear energy producing side of the plant. It is of standardized modular construction to minimize site specific design, site work and in-situ construction. The Air Turbine Generator 120 is of modular design, preferably with counter-rotating planes of blades mounted directly onto their own generator shafts. The Air Turbine Generator 120 used does not need to be marinized. They are small and light enough to be trucked to the site.

Advantages

CONCLUSIONS, RAMIFICATIONS, AND SCOPE OF INVENTION

Thus the reader will see the invention absorbs a broad spectrum of river energy and because it can be configured in the form of a semi-submerged array of devices it maximizes surface area thus increasing overall power output. The device is designed for both offshore and tidal and river siting and uses a time-tested low speed, high torque propeller to extract energy which can handle breaking rivers weighing several tons. The invention utilizes rounded, non-fouling, self-cleaning surfaces to repel debris and marine growth. Its low speed, rounded surfaces and minimal anchor cables provide safety for wildlife. The device is self righting and submerges below storm conditions. It has minimum parts to reduce costs and breakdowns. The device is composed of mostly available parts. The invention minimizes internal, inertial/mass and surface frictions. It is easy to install on site and to remove for annual service. The device does not have a complicated electric system. It can be situated in many currently unusable hydropower sites.

While my above descriptions contains specificities, these should not be construed as limitations on the scope of the invention, but rather as an exemplification of one preferred embodiment thereof. Many other variations are possible.

In an alternate embodiment air can be injected into the water through the turbine hub and propeller blade tips to improve water quality.

An alternate embodiment comprises a forward buoyancy tank 214 and aft buoyancy tank 218 placed inside the stabilizer tube. The angle of the propeller can be altered relative to the oncoming current by changing the amount of water ballast in the buoyancy tanks.

An alternate embodiment is to attach the strut to the rear of the stabilizer tube rather than at the middle thus allowing the entire strut and energy absorber to be able to hinge upward for service and repair using an electric-pneumatic powered hinge. The stabilizer tube would be reshaped so the bow would be narrower leading to a wider and deeper stern section to bring the center of buoyancy back toward the stern.

An alternate embodiment where the river and tidal energy module directs the compressed air to a shore side module where the compressed air drives a pump of a reverse osmosis desalinator converting river or sea water into fresh clean water.

An alternate embodiment where the river and tidal energy module directs the compressed air shore side where the compressed air drives the pump of a reverse osmosis desalinator converting river or sea water into clean water which is then pumped into an electrolyzer powered by an air pressure driven turbine electric generator. This is used to split the water into hydrogen where it is liquefied and distributed.

An alternate embodiment is to replace the use of steel in the stabilizer tube, nacelle and strut with high strength composite polymer materials.

In an alternate embodiment the steel in the stabilizer tube is sealed from the seawater with polymer coatings.

An alternate embodiment uses polymer sections glued to the surface of the stabilizer tubes above the waterline to camouflage its shape making it appear to be something natural such as a line of rocks, waves, bushes, a sand bar or a decorative style such as a line of swimming porpoises, sea horses or spirals.

In an alternate investment, small winged are attached from the nacelle downward to support the device if the water level falls to low and the device is uncovered.

In an alternate embodiment, the stabilizer tubes, strut and propellers are composed of standard marine grade fiberglass or high strength moldable engineered polymer which can be cost effectively and rapidly molded using female and male low pressure molds.

In an alternate embodiment the river and tidal energy module can be scaled down for lower energy density sites including an approximate 25 kW unit and a 10 kW unit.

In an alternate embodiment the shape of the propellers can be altered using leading and trailing edge flaps.

In an alternate embodiment for tidal applications the array of river and tidal energy modules is attached to each end to a floating buoy. It flexes back and forth as the tides change direction. The river and tidal energy modules are modified with flip up rudders on both ends and propeller on both front and back of the nacelle which operate in a counter-rotating fashion. When the tides change the back rudder rotates down into the water and the opposite rudder rotates upward.

In an alternate embodiment the surface of the propellers can be enhanced with the use of foils, dimples, riblets and other micro shapes to induce more or less drag.

In an alternate embodiment various approaches can be used to keep the surface of the stabilizer tube and propellers clean including ecologically safe anti-fouling and silicon paints.

In an alternate embodiment large scale thermoforming can replace injection molding, fiberglass lay-up and compression molding for large scale parts. These thermoformable resins reduce manufacturing costs, offer molded in decration, and are weather proof, scratch resistant and impact resistant.

In an alternate embodiment each energy absorber automatically reshapes and retunes itself for changing currents via the flexible characteristics molded into the composite material composing each propeller blade.

In an alternate embodiment the strut is attached to the stabilizer tube further forward and angled 45% toward the rear.

In an alternate embodiment the propeller is mounted on the nacelle in front of the strut.

In an alternate embodiment the array of devices is used as a footbridge.

In an alternate embodiment the propellers is designed to eliminate fouling, reduce marine growth and deal with tidal and river borne debris.

In an alternate embodiment the propeller is replaced by a vertical fish tail shaped configuration. Recent studies have found that the cantilevered wing section in birds and fish is more energy efficient than the propeller used by humans. The strut is the leading edge of a wing with a hinged aft section and trailing ailerons for trim. The back and forth action will pull power out of each passing breaking river. It will be silent and non-fouling.

In an alternative design the energy absorber rotates a chain drive connected to a permanent magnet generator attached to the base of the strut situated inside the stabilizer tube sending electricity via high power underwater cable onshore to the main power grid. Permanent magnet generators need no gearbox thereby reducing both losses in power and maintenance costs significantly.

In an alternative configuration the stabilizer and propeller are combined to create a horizontal whale tail configuration. This whale tail powers an air pump at its base as it sweep up and down through the passing current.

In an alternative configuration the strut supporting the energy absorber is configured like a centerboard which slides up and down through the stabilizer tube controlled by hydraulic pressure thus changing the depth of the apparatus for changing river conditions.

In an alternative embodiment dual counter-rotating propellers are attached to the rear of the strut.

In an alternative embodiment a debris screen can be attached to the bow.

In an alternative configuration the strut can be designed with various shapes, lengths, widths, curves, and materials.

In an alternative configuration the stabilizer tubes can be designed with various shapes, lengths, widths, curves, and materials.

In an alternative configuration the propellers can be designed as single propellers with multiple blades of with various shapes, lengths, widths, curves, and materials.

I claim:

1. An energy module comprising:
   a. an energy absorber comprising:
      i. a nacelle;
      ii. a propeller comprising a plurality of blades attached to the nacelle at a hub to drive an air compressor to compress air; and
   b. a mooring system comprising:
      i. a negative-lift wing-shaped polymer shell attached to the nacelle, the negative-lift wing-shaped polymer shell designed to utilize the force of a passing current to create a downward force and thereby reduce any upward motion in the energy module,
      ii. a mooring cable housed inside the negative-lift wing-shaped polymer shell and anchored onshore to maintain the energy module in a fore and aft and a side-to-side position to provide stability, and to negate a rotational force on the energy module, and
      iii. a high pressure hose housed inside the wing-shaped polymer shell to transfer the compressed air to an air turbine generator for conversion into electricity.

2. The energy module of claim 1 further comprising
   a. a strut attached to the nacelle; and
   b. a stabilizer tube attached to the strut to provide support for the energy absorber, the stabilizer tube comprising a bow end and a stern end opposite the bow end.

3. The energy module of claim 2, wherein the bow end is configured with a negative lift shape and the stern end is configured with a negative lift shape.

4. The energy module of claim 2 further comprising a communications cable housed in the wing-shaped polymer shell for communicating signals to or from the energy module.

5. The energy module of claim 2 further comprising an anti-cavitation plate attached to the strut to reduce air intrusion to the propeller.

6. The energy module of claim 2 further comprising a wiring harness applied to a surface of the stabilizer tube for transmitting signals to or from the energy module.

7. The energy module of claim 2 further comprising a forward buoyancy tank and an aft buoyancy tank inside the stabilizer tube that can be ballasted with water to alter an angle of the propeller relative to an oncoming current.

8. The energy module of claim 2, wherein the strut is attached to the bow end of the stabilizer tube and tilted approximately 45 degrees towards the stern end.

9. The energy module of claim 2, wherein the strut slides up and down through the stabilizer tube controlled by a hydraulic pressure.

10. The energy module of claim 2 further comprising a second propeller attached to the nacelle opposite the first propeller, such that the second propeller rotates in the opposite direction relative to the first propeller.

11. The energy module of claim 1, wherein the plurality of blades are curved to shed debris.

12. An array of energy modules comprising a plurality of energy modules, each comprising:

a. an energy absorber comprising a propeller attached to a nacelle, the nacelle comprising an air compressor to compress air;
b. a negative-lift wing-shaped polymer shell attached to the nacelle;
c. a mooring cable housed inside the negative-lift wing-shaped polymer shell connecting the plurality of energy absorbers to each other and connecting the plurality of energy absorbers to a riverbank to maintain the array of energy modules in a fore and aft and a side-to-side position to provide stability, and to negate a rotational force on the array of energy modules; and
d. a high pressure hose housed inside the negative-lift wing-shaped polymer shell to transfer compressed air from each energy absorber to an air turbine generator for conversion into electricity.

13. The array of energy modules of claim 12 further comprising:
a. a strut attached to the nacelle; and
b. a stabilizer tube attached to the strut to support the energy absorber.

14. The array of energy modules of claim 12, wherein the propeller of a first energy module spins in an opposite direction relative to the propeller of a second energy module adjacent to the first energy module, to counteract a rotational force placed on the array of energy modules.

15. The array of energy modules of claim 12 further comprising a communications cable housed inside the wing-shaped polymer shell for communicating signals to or from the array of energy modules.

16. The array of energy modules of claim 12, wherein each energy module further comprises a wiring harness applied to a surface of the stabilizer tube for transmitting signals to or from the energy module.

17. The array of energy modules of claim 12, wherein each energy module comprises a forward buoyancy tank and an aft buoyancy tank inside the stabilizer tube that can be ballasted with water to alter an angle and depth of the propeller relative to an oncoming current.

18. A method of harnessing energy from a river comprising:
a. providing a plurality of energy modules comprising a negative-lift wing-shaped polymer shell;
b. interconnecting each energy module at the negative-lift wing-shaped polymer shell with a mooring cable and a high pressure hose housed inside the negative-lift wing-shaped polymer shell to maintain the plurality of energy modules in a fore and aft and a side-to-side position to provide stability, and to negate a rotational force on the plurality of energy modules;
c. converting a mechanical energy created by a river flow into compressed air by the plurality of energy modules; and
d. transferring the compressed air from the plurality of energy modules to an air turbine electric generator through the high pressure hose to convert the compressed air into electricity, thereby harnessing energy from the river.

19. The method of claim 18 further comprising adjusting a depth level of the energy absorber for the purpose of maximizing the power converted or operating in conditions that does not allow for the power conversion at a particular depth.

20. The method of claim 18, wherein the depth level is adjusted by filling or emptying a buoyancy tank to lower or raise, respectively, the depth level of the energy absorber as needed.

21. The method of claim 18 further comprising adjusting an angle of the energy absorber to compensate for changing river current conditions, thereby maximizing energy conversion.

* * * * *